United States Patent [19]

Shimamori et al.

[11] Patent Number: 4,499,192

[45] Date of Patent: Feb. 12, 1985

[54] SILICON NITRIDE SINTERED PRODUCTS HAVING HIGH CORROSION RESISTANCE AND PROCESS FOR PRODUCTION THEREOF

[75] Inventors: Toru Shimamori; Yoshinori Hattori; Yasushi Matsuo, all of Aichi, Japan

[73] Assignee: NGK Spark Plug Co., Ltd., Aichi, Japan

[21] Appl. No.: 444,119

[22] Filed: Nov. 24, 1982

[30] Foreign Application Priority Data

Nov. 30, 1981 [JP] Japan ................................ 56-192451

[51] Int. Cl.$^3$ .............................................. C04B 35/58
[52] U.S. Cl. ......................................... 501/97; 501/98
[58] Field of Search ...................................... 501/97, 98

[56] References Cited

U.S. PATENT DOCUMENTS

| | | | |
|---|---|---|---|
| 4,156,051 | 5/1979 | Nakamura et al. | 501/98 |
| 4,180,410 | 12/1979 | Masaki | 501/98 |
| 4,230,494 | 10/1980 | Nakamura et al. | 501/97 |
| 4,264,548 | 4/1981 | Ezis | 501/98 |
| 4,280,850 | 7/1981 | Smith et al. | 501/97 |

Primary Examiner—Mark Bell
Attorney, Agent, or Firm—Sughrue, Mion, Zinn, Macpeak & Seas

[57] ABSTRACT

A silicon nitride sintered product and processes for the production thereof are described, wherein the product comprises from 75 to 97.9% by weight of silicon nitride, from 2 to 20% by weight of yttrium oxide and cerium oxide in a molar ratio of cerium oxide to yttrium oxide of 0.4/1 to 4/1, and from 0.1 to 8% by weight of aluminum oxide.

1 Claim, No Drawings

SILICON NITRIDE SINTERED PRODUCTS HAVING HIGH CORROSION RESISTANCE AND PROCESS FOR PRODUCTION THEREOF

FIELD OF THE INVENTION

The present invention relates to silicon nitride sintered products having excellent mechanical strength and excellent corrosion resistance and to processes for production thereof.

BACKGROUND OF THE INVENTION

Because silicon nitride sintered products are excellent in various properties such as mechanical strength, heat resistance, etc., they are used as high temperature structural materials, such as for parts of gas turbines. However, on the other hand, silicon nitride has a poor sinterability because of having a highly covalent bonding nature, and, consequently, it is difficult to obtain sintered products having a high density and high strength, employing silicon nitride per se. Therefore, in the case of sintering silicon nitride, sintering aids including MgO, $Al_2O_3$, oxide of rare earth elements, etc., have been used hitherto. However, sintered products using MgO as a sintering aid have inferior oxidation resistance because $MgSiO_3$, etc., are formed in the oxidizing atmosphere. In sintered products using $Y_2O_3$ as a sintering aid, the oxidation resistance deteriorates extremely if $YSiO_2N$ and $Si_3Y_2O_3N_4$ are formed as the second phase (the meaning of which is hereinafter explained) as opposed to forming $Si_2ON_2$, $Y_2Si_2O_7$, or $Y_5Si_3O_{12}N$. Formation of the second phase is affected by the amount of $Si_3N_4$, $SiO_2$, or $Y_2O_3$, the kind and the amount of other sintering aids, the sintering atmosphere, etc., and it is difficult to correctly control these factors. In the case of using $CeO_2$ as a sintering aid, the second phase composition having good oxidation resistance is not formed in an $Si_3N_4$-$CeO_2$ system, because $CeO_2$ is reduced to $Ce_2O_3$ during sintering and the produced oxygen reacts with $Si_3N_4$ to form $SiO_2$. In the case of using other oxides of rare earth elements as sintering aids, compositions having improved oxidation resistance have not yet been obtained.

SUMMARY OF THE INVENTION

Thus, the present inventors have conducted extensive research on sintering aids to be added to silicon nitride in order to improve oxidation resistance. As a result, it has now been found that sintered products having excellent oxidation resistance can be produced by using yttrium oxide and cerium oxide in a specified ratio as sintering aids, and using further aluminium oxide, by which the present invention has been achieved. More particularly, the present invention relates to silicon nitride sintered products consisting essentially of from 75 to 97.9% by weight of silicon nitride, from 2 to 20% by weight of yttrium and cerium oxide in a molar ratio of cerium oxide to yttrium oxide of from 0.4/1 to 4/1, and from 0.1 to 8% by weight of aluminum oxide, and to processes for production thereof.

DETAILED DESCRIPTION OF THE INVENTION

In the following, the present invention is illustrated in greater detail.

In the case of using $Y_2O_3$ as the sintering aid, it is preferred that the second phase is $Si_2ON_2$, $Y_2Si_2O_7$ or $Y_5Si_3O_{12}N$. In order to form these phases, a certain amount of oxygen or $SiO_2$ is necessary. As a feed source of oxygen or $SiO_2$, oxygen released by reduction of $CeO_2$ to $Ce_2O_3$ during sintering or active $SiO_2$ formed by reacting such oxygen with $Si_3N_4$ is most suitable. In contrast, if an $SiO_2$ powder is added previously, an effect of forming the preferred second phase is poor. Furthermore, cerium oxide yields compounds having good oxidation resistance such as $Ce_2Y_2O_7$, etc., by reaction with yttrium oxide.

Although the ratio of cerium oxide to yttrium oxide depends upon the composition of the second phase to be formed, it is necessary that a molar ratio of cerium oxide to yttrium oxide be from 0.4/1 to 4/1 so as to form compounds of cerium oxide and yttrium oxide having good oxidation resistance, and not to form $YSiO_2N$, $Si_3Y_2O_3N_4$, and compounds of cerium oxide having inferior oxidation resistance. If the molar ratio is lower than 0.4/1, yttrium compounds having inferior oxidation resistance are formed. If it is larger than 4/1, cerium compounds having inferior oxidation resistance are formed. Further, the total amount of both of these oxides in the sintered product should be in the range of from 2 to 20% by weight. If the amount is less than 2% by weight, the sinterability becomes poor. If it is larger than 20% by weight, the oxidation resistance deteriorates. However, in this $Si_3N_4$-$Y_2O_3$-$CeO_2$ system, products having sufficient density cannot be formed except by using a hot pressing. Therefore, it is necessary to add a sintering aid for promoting densification without changing the preferred second phase.

As a result of further extensive studies, it has been found that this problem can be solved by adding from 0.1 to 8% by weight of aluminum oxide (i.e., the amount of aluminum oxide in the sintered product should be in the range of from 0.1 to 8% by weight). If the amount of aluminum oxide is lower than 0.1%, sufficient density cannot be obtained. If it is larger than 8% by weight, the oxidation resistance deteriorates.

Further, in the sintered products of the present invention, silicon nitride should be present in an amount of from 75 to 97.9% by weight. If the amount is lower than 75% by weight, the oxidation resistance deteriorates, because the amount of grain boundary phase becomes too large. If it is larger than 97.9% by weight, the sinterability becomes poor, because the content of sintering aids are too low.

The grain boundary phase generally consists of (1) a glassy phase, (2) a glassy-and-crystal-containing phase, and (3) a crystal phase. It is known that silicon nitride sintered products mainly consist of the glassy phase and the glassy-and-crystal-containing phase. The crystal phase in the grain boundary is called "a second phase" by one skilled in the art.

In order to obtain the sintered products of the present invention, silicon nitride and sintering aids consisting of yttrium oxide, cerium oxide and aluminum oxide are blended, first, so as to result in a product containing from 75 to 97.9% by weight of silicon nitride, from 2 to 20% by weight of a mixture of cerium oxide and yttrium oxide having a molar ratio of from 0.4/1 to 4/1, and from 0.1 to 8% by weight of aluminum oxide, ground, for example, using a ball mill, etc., and molded under a pressure of about 2,000 kg/cm² into a desired shape. Then, the moldings are sintered at a temperature of from 1,600° to 2,200° C. under an atmospheric pressure or an increased pressure of 3,000 atm. or less in a nitrogen gas or a nonoxidizing atmosphere containing a nitrogen gas.

Silicon nitride used as a raw material in the present invention preferably contains 50% or more thereof in the α-phase. That is, successful sintering of silicon nitride is closely related to the relative amounts in the α- and β-phase, and satisfactory sintering cannot be carried out if the α-phase is less than 50%. In order to obtain sufficient sintered products, it is preferred that silicon nitride and sintering aids are ground so as to have a particle size of 10 microns or less.

In the present invention, it is possible to use a raw material capable of forming silicon nitride, such as a metallic silicon powder instead of silicon nitride as the starting raw material, which is blended with the above-described sintering aids, molded and sintering at from 1,200° to 1,500° C. in a nitrogen gas atmosphere to form a silicon nitride reaction sintered product. The reaction sintered product is then sintered at a temperature of from 1,600° to 2,200° C. under atmospheric pressure or an increased pressure of 3,000 atm. or less in nitrogen gas or a nonoxidizing atmosphere containing nitrogen gas.

Silicon nitride sintered products of the present invention obtained as described above have high density, high mechanical strength and excellent oxidation resistance at high temperature. Accordingly, they are suitable as parts for gas turbine engines, diesel engines, and cutting tools, which require oxidation resistance.

The present invention is hereinafter illustrated in greater detail by examples, but the present invention is not limited to the examples.

EXAMPLE 1

A silicon nitride powder having an average particle size of 0.7 μm was blended with a $Y_2O_3$ powder having an average particle size of 1.0 μm, a $CeO_2$ powder having an average particle size of 1.0 μm and an $Al_2O_3$ powder having an average particle size of 1.0 μm in amounts shown in Table 1 as Sample Nos. 1, 2, 3, 5, 6, 8, 9, 10, 11, 12, 13, 14, 15, 16, 17 and 18, and the resulted mixture was molded under a pressure of 2,000 kg/cm². Then, the resulting moldings were sintered at from 1,600° to 2,050° C. under a pressure of from 1 to 2,000 atms. in a nitrogen atmosphere for 1 hour.

In Sample Nos. 4 and 7, a metallic silicon powder having an average particle size of 1.0 μm was blended with a $Y_2O_3$ powder having an average particle size of 1.0 μm, a $CeO_2$ powder having an average particle size of 1.0 μm and an $Al_2O_3$ powder having an average particle size of 1.0 μm so as to result in the amounts shown in Table 1 after reaction sintering, followed by molding at a pressure of 2,000 kg/cm², carrying out reaction sintering at a temperature of less than 1,450° C. in a nitrogen atmosphere, and sintering at a temperature of 1,900° C. or 2,150° C. under a pressure of 20 atm. or 100 atm. in a nitrogen atmosphere for 1 hour, respectively. Then, the strength of these samples at room temperature (about 20° C.) and the weight gain and strength at room temperature after being subjected to oxidation at 1,300° C. for 100 hours were measured.

Further, measurement of strength was carried out using a test sample having a section of 8 mm×4 mm by a 3 point bending method for a 20 mm span according to JIS B-4104-1970 to measure flexural strength at room temperature. The weight gain of test sample after being subjected to oxidation was calculated as $(W_2-W_1)/S$ (mg/cm²), wherein $W_1$ is the weight of the sample before being subjected to oxidation (mg), $W_2$ is the weight of the sample after being subjected to oxidation (mg) and S is the surface area of the sample (cm²). The results are shown in Table 1.

TABLE 1

| Sample No. | Composition $Si_3N_4$ (wt %) | $Y_2O_3 + CeO_2$ (wt %) | $CeO_2/Y_2O_3$ (molar ratio) | $Al_2O_3$ (wt %) | Sintering Condition Temperature (°C.) | Pressure (atm) | Properties of Sintered Product Strength at Room Temperature (kg/mm²) | Weight Gain by Oxidation 1300° C. × 100 Hr (mg/cm²) | Strength after Oxidation (kg/mm²) |
|---|---|---|---|---|---|---|---|---|---|
| 1 (Present Invention) | 94 | 3 | 0.4 | 3 | 2,050 | 80 | 102 | 0.8 | 88 |
| 2 (Present Invention) | 84 | 10 | 0.4 | 6 | 1,750 | 1 | 90 | 2.1 | 80 |
| 3 (Present Invention) | 82 | 16 | 0.4 | 2 | 1,750 | 1 | 85 | 2.2 | 80 |
| 4 (Present Invention) | 91* | 8 | 1 | 1 | 1,900 | 20 | 81 | 1.0 | 79 |
| 5 (Present Invention) | 87 | 12 | 1 | 1 | 1,850 | 20 | 83 | 0.9 | 79 |
| 6 (Present Invention) | 85 | 14 | 1 | 1 | 1,800 | 20 | 83 | 1.1 | 78 |
| 7 (Present Invention) | 95** | 4 | 2 | 1 | 2,150 | 100 | 75 | 2.5 | 74 |
| 8 (Present Invention) | 85 | 14 | 2 | 1 | 1,800 | 2,000 | 82 | 1.1 | 77 |
| 9 (Present Invention) | 83.5 | 16 | 2 | 0.5 | 1,900 | 20 | 80 | 1.0 | 78 |
| 10 (Present Invention) | 90 | 5 | 4 | 5 | 1,800 | 20 | 98 | 1.3 | 85 |
| 11 (Present Invention) | 82 | 10 | 4 | 8 | 1,650 | 1 | 84 | 2.4 | 73 |
| 12 (Present Invention) | 79.9 | 20 | 4 | 0.1 | 1,950 | 20 | 79 | 1.3 | 76 |
| 13 (Comparative Example) | 95 | 1 | 1 | 4 | 2,000 | 50 | 55 | 3.0 | 55 |
| 14 (Comparative Example) | 71 | 25 | 1 | 4 | 1,600 | 1 | 69 | 3.1 | 50 |
| 15 (Comparative Example) | 81 | 15 | 0.2 | 4 | 1,750 | 1 | 87 | 2.6 | 63 |

TABLE 1-continued

| Sample No. | Composition | | | | Sintering Condition | | Properties of Sintered Product | | |
|---|---|---|---|---|---|---|---|---|---|
| | $Si_3N_4$ (wt %) | $Y_2O_3 + CeO_2$ (wt %) | $CeO_2/Y_2O_3$ (molar ratio) | $Al_2O_3$ (wt %) | Temperature (°C.) | Pressure (atm) | Strength at Room Temperature (kg/mm$^2$) | Weight Gain by Oxidation 1300° C. × 100 Hr (mg/cm$^2$) | Strength after Oxidation (kg/mm$^2$) |
| 16 (Comparative Example) | 81 | 15 | 8 | 4 | 1,750 | 1 | 86 | 2.5 | 60 |
| 17 (Comparative Example) | 85 | 15 | 1 | 0 | 2,000 | 50 | 60 | 2.0 | 48 |
| 18 (Comparative Example) | 75 | 10 | 1 | 15 | 1,600 | 1 | 58 | 2.0 | 45 |

* and **: Si was used as a starting raw material instead of $Si_3N_4$.

As can be understood from Table 1, the products of the present invention containing $Si_3N_4$, $Y_2O_3$, $CeO_2$, and $Al_2O_3$ in above-described ranges of the present invention have excellent strength before and after being subjected to oxidation as compared with Comparative Examples 13 to 18, which are outside the scope of the present invention, and they are excellent as corrosion-resisting high temperature structural materials.

While the invention has been described in detail and with reference to specific embodiments thereof, it will be apparent to one skilled in the art that various changes and modifications can be made therein without departing from the spirit and scope thereof.

What is claimed is:

1. A silicon nitride sintered product having high corrosion resistance consisting essentially of from 75 to 97.9% by weight of silicon nitride, from 2 to 20% by weight of yttrium oxide and cerium oxide in a molar ratio of cerium oxide to yttrium oxide of from 0.4/1 to 4/1, and from 0.1 to 8% by weight of aluminum oxide.

* * * * *